3 Sheets—Sheet 1.
J. A. GROVE.
DITCHING-MACHINES.
No. 193,815. Patented Aug. 7, 1877.
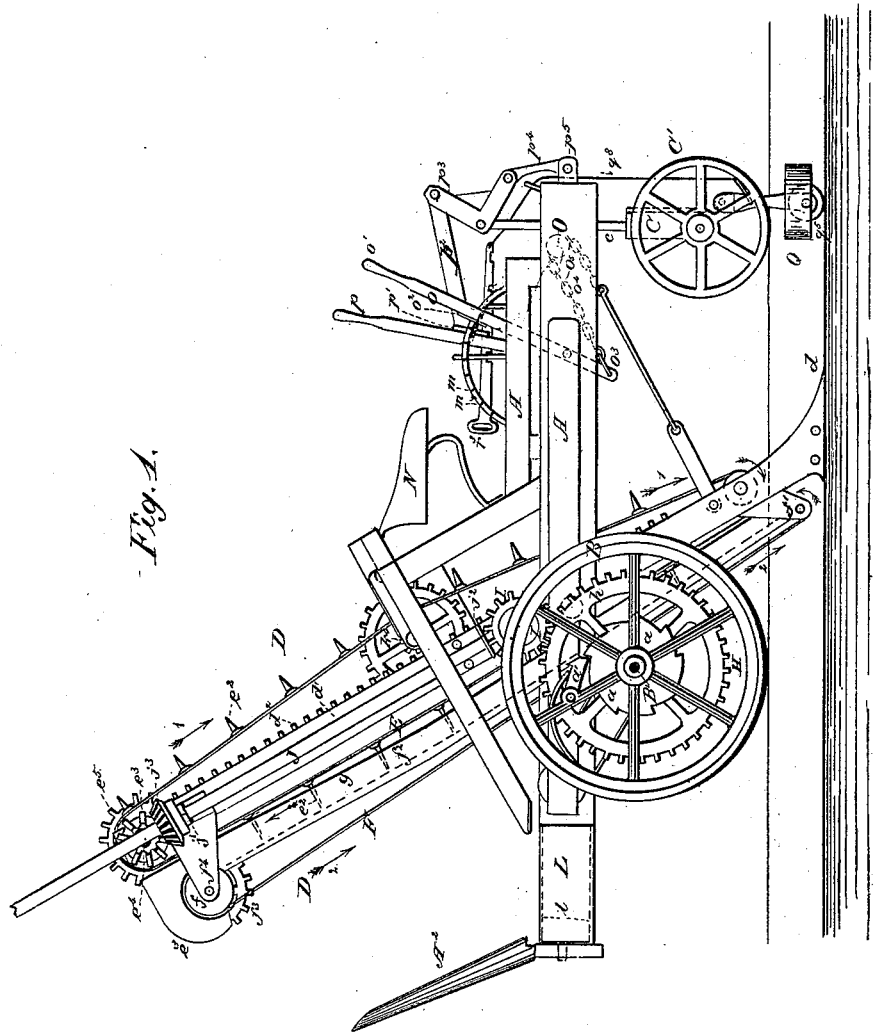
Attest:
Colborne Brookes
R. H. Lacey.
Inventor:
John A. Grove
By R. S. & A. P. Lacey
attorneys.
N. PETERS, PHOTO-LITHOGRAPHER, WASHINGTON, D. C.

J. A. GROVE.
DITCHING-MACHINES.
No. 193,815.  Patented Aug. 7, 1877.
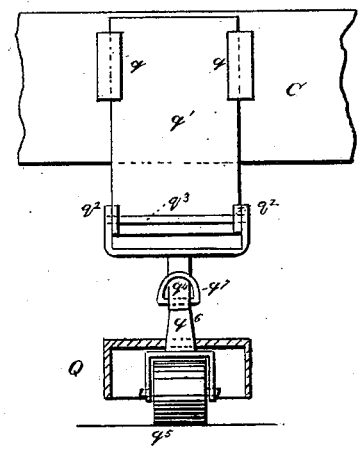
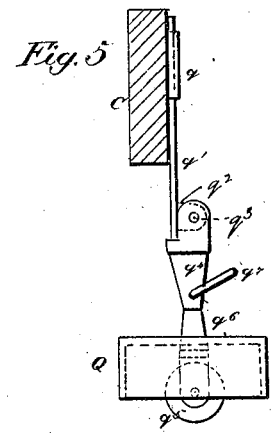
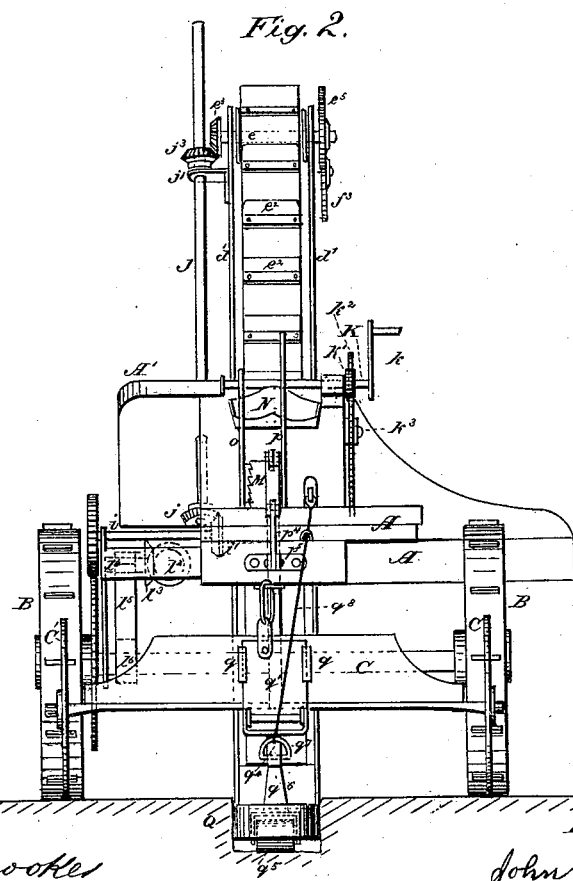

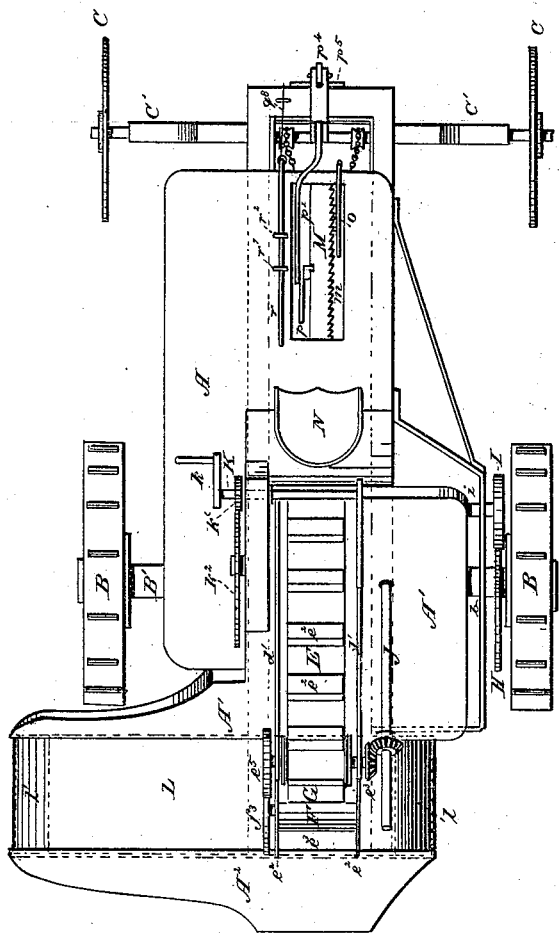

UNITED STATES PATENT OFFICE.

JOHN A. GROVE, OF BLUFFTON, INDIANA.

IMPROVEMENT IN DITCHING-MACHINES.

Specification forming part of Letters Patent No. 193,815, dated August 7, 1877; application filed May 7, 1877.

*To all whom it may concern:*

Be it known that I, JOHN A. GROVE, of Bluffton, in the county of Wells and State of Indiana, have invented certain new and useful Improvements in Ditching-Machines; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in ditching-machines, the nature of which will be fully understood by reference to the accompanying drawings, in which—

Figure 1 represents a side view, Fig. 2 a front view, Fig. 3 a plan, and Figs. 4, 5, and 6 detail views, of a ditching-machine constructed according to my invention.

In each of the views similar letters of reference are employed to indicate corresponding parts wherever they occur.

A A represent the main framing, which is supported on two main driving-wheels, B B, and a beam or under carriage, C, supported on wheels C'. $d$ represents the cutter, which is supported and carried by the elevator D, which is capable of adjustment vertically, as hereinafter explained, in order to regulate the depth of channel formed by the cutter $d$. The sides $d^1$ of the elevator D form a channel in which, by means of rollers $e$ $e^1$, an endless band or chain, E, is conducted, upon the outer surface of which is mounted a series of elevating plates or buckets, $e^2$ $e^2$. F is another endless band conducted over rollers $f f^1$, supported and revolving between plates $f^2 f^2$ in such manner that the band F shall act with the buckets $e^2$ $e^2$, the band or chain E, and the plates $f^2 f^2$ to form a channel, G, with a series of receptacles, $g$, for the purpose of raising the earth displaced by the cutter $d$.

The wheels B are mounted so as to revolve freely on an axis, B', which revolves in bearings $b$, carried by the main framing A. Upon the axis B' on each side of the apparatus is mounted a ratchet-wheel, $a$, which is driven by means of a ratchet, $a'$, supported on an axis carried by the wheels B, by means of which, when the apparatus is being drawn forward by horse or other power, motion is communicated to the working parts, as hereinafter explained; but when the apparatus is being drawn backward for any cause, or when the same is being turned, the ratchets $a'$ will slip and allow the free revolution of the wheels B independently of the other mechanism.

H is a cog-wheel, mounted on the axis B', which engages with a gear-wheel, I, mounted on one end of a shaft, $i$, carried by the main framing A, on the opposite end of which is affixed a bevel-wheel, $i'$, which engages with a corresponding bevel-wheel, $j$, mounted on the lower end of the vertical shaft J supported with capability of revolving in bearings $j^1 j^2$. $j^3$ is a bevel-wheel, mounted on the shaft J in such manner that it shall revolve with the shaft J, but at the same time is capable of freely sliding thereon vertically, in order that it may at all times engage with the bevel-pinion $e^3$, mounted on one end of the shaft $e^4$ of the roller $e$, on the opposite end of which is affixed the cog-wheel $e^5$, which gears into and drives a cog-wheel, $f^3$, affixed on the end of the shaft $f^4$ of the roller $f$, thereby giving a simultaneous motion to the chain or band E and belt F.

The elevator D, with its working parts, is raised and lowered by means of a winch-handle, $k$, affixed on one end of a shaft, K, upon which is mounted a pinion, $k^1$, gearing into a cog-wheel, $k^2$, mounted on the end of a shaft, $k^3$, upon which is affixed a pinion, $k^4$, the teeth of which engage with a toothed rack, $d^2$, formed on, or affixed to, the face of the elevator D.

The chain or band E and belt F are caused to revolve in the direction of the arrows 1 1, thereby causing the earth displaced by the cutter $d$ to be carried up by the elevating plates or buckets $e^2$, and discharged through the mouth $e^3$ onto the inclined platform A², down which it slides to an endless traveling belt, L, which is supported on rollers $l$ $l^1$, and arranged to operate between the inclined platforms A¹ A².

Motion is communicated to the traveling belt L, in the direction of the arrow 2, by means of a bevel-pinion, $l^2$, mounted on the shaft of the roller $l$, which is driven by means of a bevel-pinion, $l^3$, affixed on a shaft, $l^4$, on which is also mounted a driving-pulley, around which passes a band, $l^5$, to which motion is communicated by means of a pulley, $l^6$, mounted on the main shaft B'.

M is a segmental rack, arranged in front of the driver's seat N. Beneath the rack M is arranged a shaft, O, upon which is mounted a pair of hand-levers, $o$ $p$.

The lever $o$, at its upper end, is formed with a suitable handle, $o^1$, and a catch, $o^2$, adapted to engage with the serrations $m$ in the face of the rack M, while its lower end is provided with a loop or ring, $o^3$, to which is attached one end of a pair of chains, $o^4$, which pass over pulleys $o^5$, and, at their lower ends, are connected to links attached to the lower front part of the frame of the elevator D, the object of the lever $o$ being to regulate the tension of the chains $o^4$, in order to insure the steadiness of the elevator D, and to prevent strain thereon when the cutters $d$ are at work.

The lever $p$ is provided with a catch, $p^1$, engaging with a suitable notch or notches in the face of the rack M. To this lever $p$ is attached one end of a connecting-rod, $p^2$, the opposite end of which is, by pin-joint, connected to one arm of an L-lever, $p^3$, which is pivoted on the end of the center-pin $c$ of the beam C, while the opposite arm of the lever $p^3$ is pivoted to the upper end of a connecting-link, $p^4$, the lower end of which is pivoted to a bracket, $p^5$, carried by the front of the frame A.

By moving the lever $p$ backward or forward the center-pin $c$ will be raised or depressed, and, consequently, the forward end of the frame A correspondingly raised or lowered, thereby altering the angle at which the various parts operate.

To the front face of the beam C a pair of guides, $q$, are attached, between which a vertical plate, $q^1$, is arranged to slide. On the lower end of the plate $q^1$ bearings $q^2$ are formed, through which passes a rod, $q^3$, upon which is pivoted the forked arm of the shaft $q^4$ of the guide-pulley Q, the object of the pulley Q being, when a trench or ditch has been cut to a given depth, that, on the next "bout," the apparatus may be guided, so that the cutter $d$ shall follow correctly the line of the sides of the ditch. $q^5$ is a small roller revolving in bearings carried by the lower end of the shaft $q^4$, and arranged within the roller Q, which, as shown by Fig. 4, is formed hollow, and revolves on a loose inclined sleeve, $q^6$, placed on the shaft $q^4$. $q^7$ is a loop affixed to the shaft $q^4$, to which is attached one end of a cord or chain, $q^8$, the other end of which is attached to the end of a sliding hand-bar or rod, $r$, working to and fro in guides $r^1$ $r^2$. The under side of the rod $r$ is notched, so as to engage with a catch or stop in the slotted guide $r^2$. When the guide-wheel Q is not required to be used, or when it is desired to raise or lower the same, the rod $r$ is pushed forward or drawn backward by its handle $r^3$, thereby letting out or drawing in the cord or chain $q^8$.

When commencing to work, or when turning the apparatus, the wheel Q is raised entirely up out of the way, so that it shall not touch the surface of the land; but immediately a second or succeeding bout is commenced, it is dropped down into the position shown by Figs. 1 and 2, when it will run in the ditch with its periphery working against the sides of the ditch, and the roller $q^5$ resting on the bottom of the same.

As the machine is conducted across a field the cutter $d$ will form the ditch, while the buckets formed by the elevating-plates $e^2$ and the bands E F will conduct the earth removed to the top of the apparatus, from which it will fall onto the inclined platform $A^2$, and slide down onto the endless belt L, by which it will be carried to one side of the trench or ditch, and there discharged.

Having thus described my invention, what I claim, and desire to secure by Letters Patent, is—

1. The combination, with a ditching-machine having an elevator, D, provided at its lower end with a cutter or cutters, $d$, and having a revolving endless belt or chain, E, buckets $e^2$, and a band, F, as described, of the endless delivery-belt L, substantially as set forth.

2. In a ditching-machine, an elevator, D, provided with a cutter or cutters, $d$, belt or chain E, buckets $e^2$, and band F, the said elevator D being capable of adjustment vertically in relation to the framing A independently of the driving means, substantially as described.

3. The combination, with a ditching-machine, of a shaft, $q^4$, provided with a roller, $q^5$, a loose inclined sleeve, $q^6$, and a horizontal guide-wheel, Q, constructed and operating substantially as and for the purpose described.

4. The combination, with the beam or under carriage of a ditching-machine, of the sliding plate $q^1$, hinged shaft $q^4$, roller $q^5$, and guide-roller Q, substantially as described.

In testimony that I claim the foregoing as my own I affix my signature in presence of two witnesses.

JOHN A. GROVE.

Witnesses:
  SAMUEL S. ROTH,
  ARTHUR L. SHARPE.